Sept. 26, 1967 D. A. NICHOLS ET AL 3,343,516
MINIMUM WIDTH TOWLINES WITH STRETCHABLE ELECTRICAL
CABLE AND IMPROVED CLAMPING MEANS Filed Aug. 31, 1966 3 Sheets-Sheet 1

INVENTORS.
DONALD A. NICHOLS
JULIUS O. NATWICK
BY

ATTORNEY

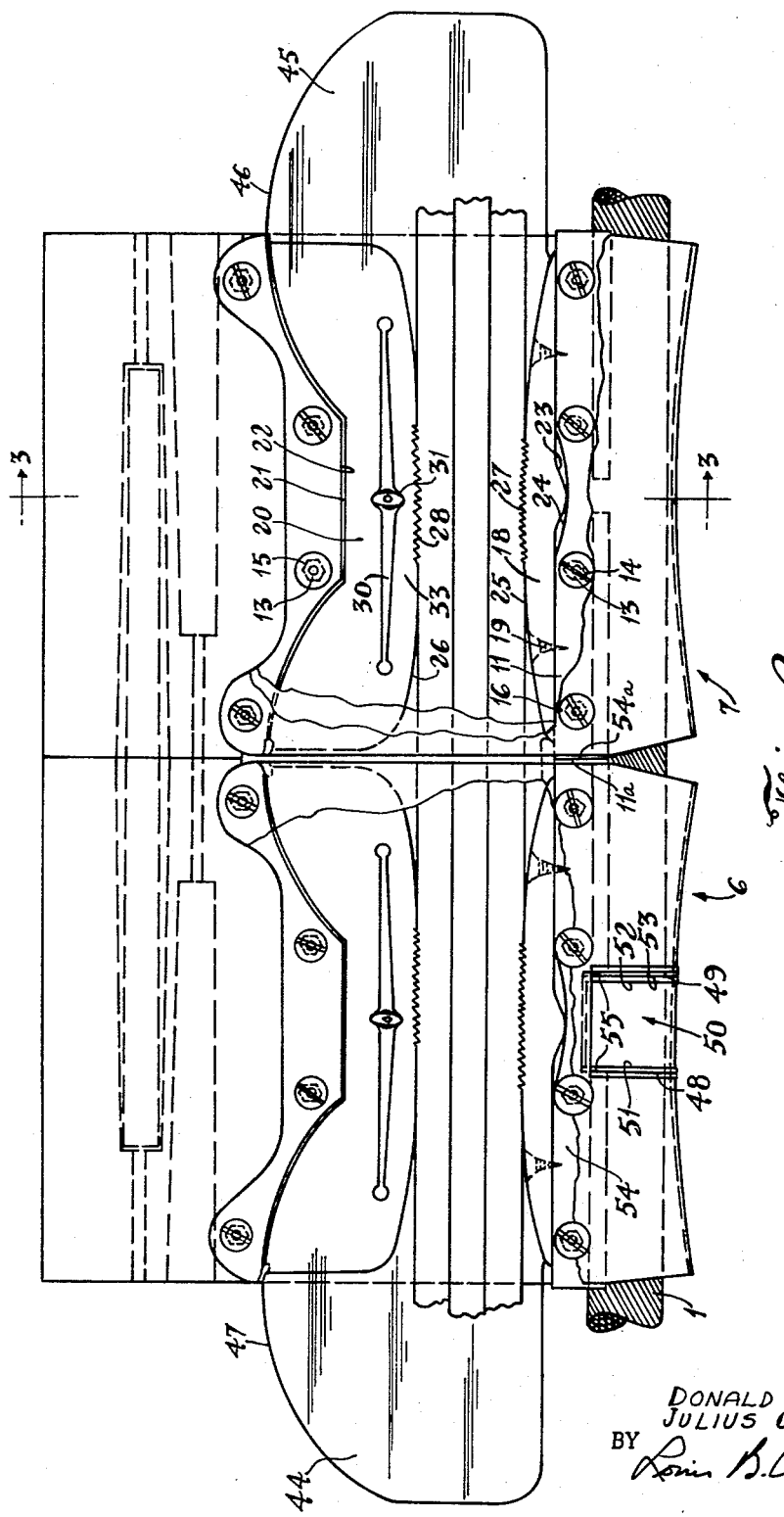

INVENTORS.
DONALD A. NICHOLS
JULIUS O. NATWICK
BY Louis B. Appleton
ATTORNEY

United States Patent Office 3,343,516
Patented Sept. 26, 1967

3,343,516
MINIMUM WIDTH TOWLINES WITH STRETCH-ABLE ELECTRICAL CABLE AND IMPROVED CLAMPING MEANS
Donald A. Nichols, Old Lyme, and Julius O. Natwick, Niantic, Conn., assignors to the United States of America as represented by the Secretary of the Navy
Filed Aug. 31, 1966, Ser. No. 576,793
6 Claims. (Cl. 114—235)

The invention described herein may be manufactured and used by or for the Government of the United States of America for governmental purposes without the payment of any royalties thereon or therefor.

This invention relates to the towing of submerged objects commonly called "fish," such as sonar devices, for example, from a ship and particularly to an improved towline including a strength member with minimum width sectioned fairing thereon and improved clamping means for supporting stretchable electrical cable housed within the fairings and along the strength member. Strength member is a term used in the art to define the mechanical cable portion of the towline as compared to the electrical cable portion thereof and is so used in the description following. Sectional fairings is a term employed to designate fairings of several inches in length as compared to continuous fairings which may be 25 feet or more in continuous length.

The term "ship" as used herein is intended to include underwater surface or air ships. However, the invention is particularly useful in a towline connecting a "fish" and a surface ship and the invention will be described in relation to such application.

In towing a "fish" during naval operations it is often necessary for the ship to move at high speeds during which water resistance or drag on the strength member and the fairing sections is considerable as is the force between adjacent fairing sections. The fairing composed of many sections abutting end to end prevents vibration of the strength member as the "fish" is towed at various speeds. The fairings also provide protection, both in the water and on the ship, for electrical cables passing through the fairing section from the ship to the towed "fish." Such towlines are required for operation of the sonar device of the "fish" from the ship.

It is a general object of the invention to provide an improved minimum width towline of the type incorporating stretchable electric cable.

A further object is to provide an improved minimum width towline having improved simple, effective, and reliable clamping means for securing the stretchable electric cables passing through the fairing sections.

Another object is to provide an improved towline having fairing sections providing for rapid and inexpensive assembly of the fairing sections to the electrical cables and the strength member.

Other objects and advantages will appear from the following description of an embodiment of the invention, and the novel features will be particularly pointed out in connection with the appended claims.

In the accompanying drawings:

FIG. 2 is an elevational view partly in cross-section of a section of the towline of FIG. 1 and including a group fairing and an adjacent support fairing;

In accordance with this invention, the streamlined fairing units are pivoted on the strength member having aligned passages in the units through and along which the strength member passes successively, and the stretchable electrical conductors, through which the ship maintains electrical communication with the towed body, are in individual cables of rectangular cross-section each cable comprising several individual conductors, the cables being disposed in a passageway abaft the strength member. Some limited separation between adjacent fairing units usually occurs when the strength member is flexed, as in use or when wound on a drum for storage, and the stretchable nature of the electric cables enable such limited relative separation and approach of adjacent fairing units.

Figure 1:
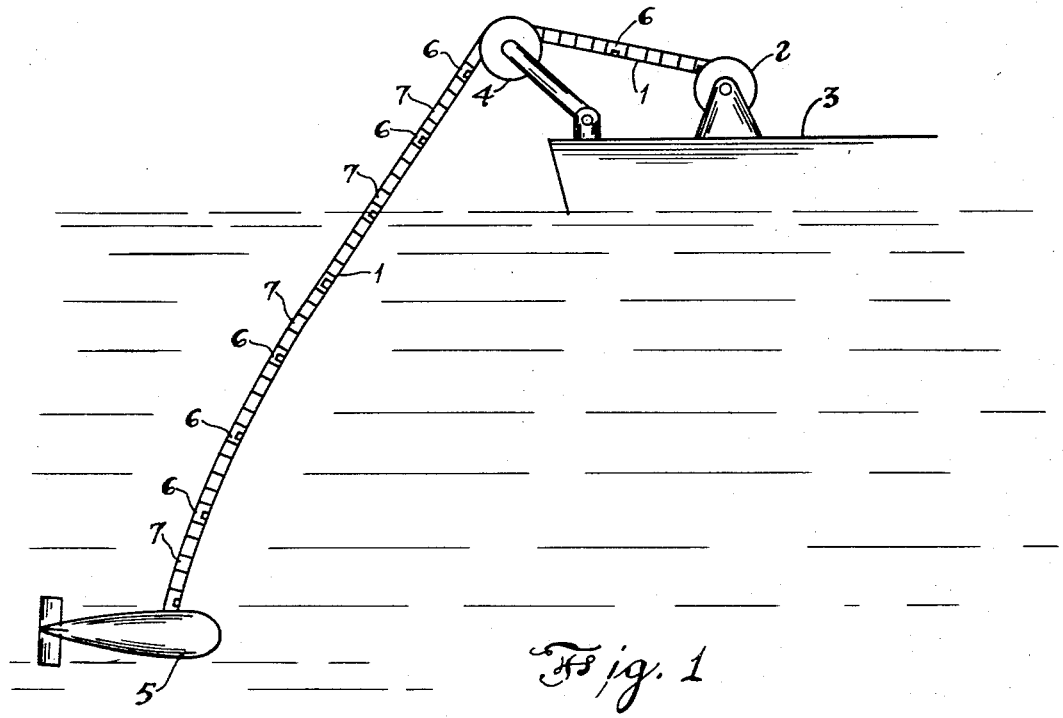
FIG. 1 is a schematic view illustrating the manner of use of a sectionally faired towline incorporating the invention in towing a submerged object from a ship.
Figure 3:
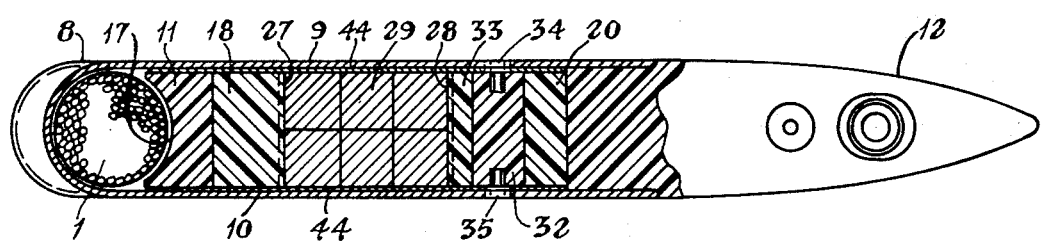
FIG. 3 is a sectional view taken on line 3—3 of FIG. 2.

In the illustrated embodiment of the invention shown in FIGS. 1 to 3 inclusive, and referring initially to FIG. 1, the usual flexible strength member 1, in use passes from the drum 2 over an idler sheave 4 into the water indicated and at its free or lower end it is pivotally attached to an object or fish 5 to be towed.

Referring to FIGS. 2 and 3, there is shown therein details of the fairing units 6 and 7 as assembled on a section of the towline. The group fairing unit 7 comprises a channel-shaped nose piece 8 having rearwardly extending sides 9 and 10 between which are secured in spaced relation a support column 11 adjacent the tow cable 1 and a tail piece 12 closing the open rearward end of the nose piece. The tail piece 12 and support column 11 are secured to the nose piece 8 by internally threaded inserts 13 set in spaced apertures 14 and 15 of column 11 and tail piece 12 and screws 16 passing through the nose piece sides and threaded into the inserts. Other suitable fastening means may also be used. The forward face 17 of the column 11 is convexly curved to follow the contour of the strength member.

The clamping means of the fairing 7 comprises a forward elongated clamping block 18 secured to the support column 11 by screws 19 or other suitable means and a rear clamp 20 supported on the tail piece 12 by a cooperative groove 21 in the clamp 20 and protrusion 22 on the tail piece 12. The forward clamping block 18 is also formed with a protrusion 23 cooperating with a groove 24 in the column 11 to aid in supporting the forward block. Both block and clamp are convexly curved as at 25 and 26 and serrated as at 27 and 28 to securely grip therebetween a plurality of electrical cables indicated at 29. The curved face 25 of the block 18 also provides a smooth circular support for the electric cables 29 when the towline is stored on the drum 2. The curved portion 26 of the clamp 20 provides clearance and a smooth surface to prevent damage to the electric cables 29. The partially assembled fairing 7 may be positioned on the strength member 1 and the electric cables 29 prior to securing the tail piece 12 and clamp 20 therein.

To provide for clamping the cables 29 between the block 18 and clamp 20, the clamp 20 is formed with a slot 30 centrally curved to provide a cam lock surface or detent 31 cooperative with an elongated cam member 32. The slot 30 provides flexibility of a forward portion 33 of the clamp 20 to be camed into gripping engagement with the cable 29.

To provide pivotal support for the cam member 32 and means for rotating the cam 32 from the exterior of the fairing 7, manually rotatable pivot supports 34 and 35 are provided. Pivot supports 34 and 35 are formed with heads having cylindrical bearing surfaces 36 and 37 accommodated in apertures 38 and 39 of the nose piece sides 9 and 10, and with shanks 40 and 41 non-rotatably fixed in the ends of the cam member by molding, cementing or other suitable means. The exterior surface of the shanks 40 and 41 are made non-cylindrical as for example, hexagonal in shape to assure non-rotation in the cam 32. The heads of the pivot supports 34 and 35 are formed with recesses 42 and 43 of hexagonal shape to receive "Allen" wrenches (not shown) for rotating the cam member 32.

To protect the electrical cables from mechanical damage, shields 44 and 45 are provided. The shields are fixed in the fairing 7 by the screws 16 and are located one on each side of the cable 29. Each shield extends beyond the side edge of its fairing to be slidably received within the next adjacent fairing and each shield is curved as at 46 and 47 to avoid interference when the tow line is bent in operation or in storage on the drum.

It is to be understood that fairings 7 are employed at spaced intervals along the towline to support, protect, and streamline the electrical cables 29. The tow line also includes fairings having support ring means incorporated into the fairing such as fairing 6. The support fairings 6 are also spaced along the tow cable and secured thereto to each to support an associated group of fairings through the column supports of the fairings.

The fairings 6, except for the means incorporated therein to pivotally fix the fairing to the strength member 1, are identical to the fairings 7 described above. Hence description of fairings 6 will be limited to the above-mentioned variation.

To pivotally fix the fairing 6 to the strength member 1, the nosepiece of fairing 6 is slotted as indicated to receive between adjacent defined edges 48 and 49 a sleeve commonly referred to in the art as a support ring 50 and thrust washers 51, 52 and 53. The support ring 50 is welded, cemented or otherwise fixed to and surrounding the strength member 1. The support column 54 is recessed as at 55 to accommodate portions of the ring and thrust washers. The adjacent ends 54a and 11a of the columns 54 and 11 project beyond the adjacent edges 56 and 57 of the nose pieces such that the load of each group of fairing 7 above its associated support fairing 6 is transmitted to the strength member 1 through the thrust washers 52–53 and the support ring 50.

The above-described tow line is advantageous in providing reliable cam-operated clamping means providing maximum cross-sectional area for the accommodation of electrical cables with minimum width of fairing. The fairings of the tow line also provide compact reliable support and housing for the electrical cables and can be easily assembled on and clamped to the electrical cables. Thus, the tail piece and rear clamping block may be removed from the nose piece to permit assembly or withdrawal of the electrical cables and the cables may be clamped in position by external operation of the manually rotatable pivot supports 34 and 35. A further advantage of the above-described tow line is obtained from the fact that should it be desired to replace the stretchable electric cables with ribbon type sinusoidal positioned electrical cables, it is possible to remove the detachable clamping blocks 18 and 33 and replace the same with the band type clamping means disclosed in our copending application No. 576,804 filed Aug. 31, 1966 and entitled "Towlines With Minimum Width Fairings." The remainder of the fairing elements remain essentially the same.

Figure 4:
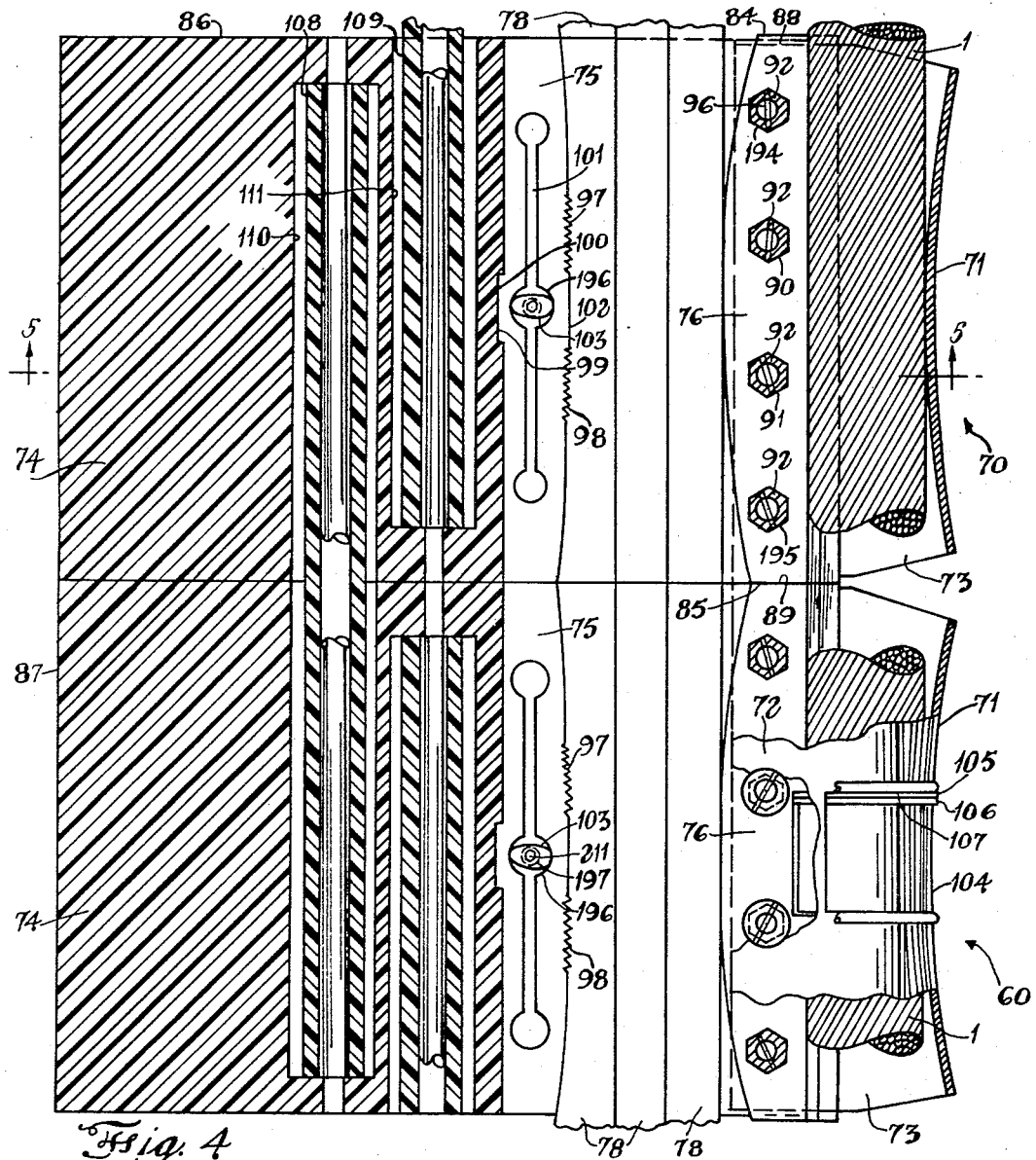
FIG. 4 is an elevational view partly in cross-section of a modified section of towline incorporating the invention.
Figure 5:
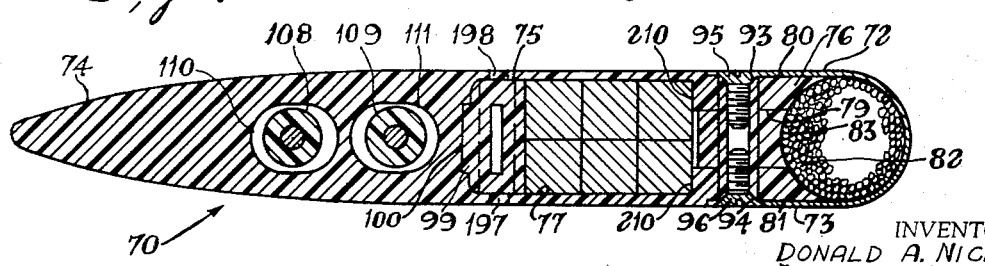
FIG. 5 is a sectional view taken on line 5—5 of FIG. 4.

Referring to FIGS. 4 and 5, there is shown a further modification of the invention in which a fairing unit generally indicated at 60 and 70 is shown attached to a section of strength member. This tow line is also adapted for use of stretchable electrical cables. The fairing unit 70 is a group fairing unit and includes a channel shaped nose piece 71 having extending sides 72–73, a streamlined tail piece 74, a cable clamp 75 and a support column 76.

The tail piece 74 is formed with a passage 77 to accommodate the clamping block 75 and portions of a plurality of electrical cables 78 passing through the tail piece. A slot 79 is formed in the forward portion of the tail piece from side to side, the slot being of sufficient dimension to pass each of the electrical cables 78 through the slot for positioning of the electrical cables in the recess 77 of the tail piece. Also the sides of the tail piece adjacent the forward portion thereof are recessed as at 80 and 81 to receive the sides 72 and 73 of the nose piece 71 and present substantially planar surfaces on each side of the fairing 70. Forward faces 82 and 83 of the tail piece 74 are curved to conform substantially to the curvature of the external surface of the strength member 1.

The support column 76 is positioned in the tail piece slot 79 with its opposite ends 84–85 in line with side edges 86 and 87 of the tail piece, extending slightly beyond side edges 88 and 89 of the nose piece. Thus, end 84 of column 76 and the aligned edges 86 of tail piece 74 extend beyond the aligned edges 88 of nose piece 71. End 85 of column 76 and the aligned edges 87 of tail piece 74 extend beyond the aligned edges 89 of nose piece 71. The amount of extension in each case is sufficient to prevent adjacent nose pieces from touching each other under all conditions of use in order to prevent mutual damage occurring to nose pieces, and to reduce friction between adjacent fairings under compressive load. The amount of extension in each case is sufficient to prevent adjacent nose pieces from touching each other under all conditions of use in order to prevent mutual damage occurring to nose pieces and to reduce friction between adjacent fairings under compressive load. The forward face of the support column 76 is concavely curved to follow the contour of the external surface of the strength member 1.

To secure the column 76 in the fairing and to secure the tail piece 74 to the nose piece 71 aligned hexagonal apertures 90, 91, 194, and 195, are formed in the tail piece and column as shown to receive internally threaded hexagonal prismatic inserts 92. Each side 72 and 73 of the nose piece 71 is apertured in alignment with each insert 92 as at 93 and 94 to pass flat-headed screws 95 and 96 threaded into opposite ends of the inserts 92.

The cable clamp 75 is elongate and its forward face is bent into a convexly curved shape along its length and that face is serrated as at 97 and 98 to engage and grip the adjacent electric cables 78. The rear face of the support column and the forward wall surface 210 of passage 77 are also convexly curved along their lengths to provide a smooth support for the electric cables when the tow line is wound on the drum. To support the clamp 75 on the tail piece 74 the tail piece and clamp are formed respectively with cooperating groove 99 and tongue 100. To provide for actuation, i.e., forward extension of the clamp 75, the clamp is made of resilient material such as polypropylene and slotted as at 101 such that a forward portion 102 thereof adjacent the cables 78 may be bent forward by a manually operable clamp-spreader cam 103, accessible from the exterior of the fairing.

The clamp-spreader cam 103 and its accompanying hole 196 in clamp 75 are so designed that when the cam is turned to the position shown in FIG. 4, the clamp is expanded sufficiently by the cam 103 to compress and securely grip the cables and also the cam 103 is in a detent position in hole 196 so that it cannot rotate by vibration or other inadvertence and allow the clamp 75 to lose its grip on the cables 78. The cam is made of stainless steel and in each of its ends is a hexagonal hole 211. In line with the hex holes 211 in the cam 103 are wrench clearance holes 197–198 in tail piece 74. The cam 103 can be rotated only by using a hexagonal prismatic wrench, inserting it into the cam 103 through hole 197 or 198. With the clamp 75 relaxed, a quarter turn of cam 103 will expand the clamp 75 in order to grip the stretchable cables 78. Conversely, a second quarter turn of the cam 103 will allow the clamp 75 to relax and release pressure on the cables 78. Wrench clearance holes 197–198 in tail piece 74 are dimensions smaller in diameter than the outer diameter of the cam, thereby preventing the cam from passing through either hole 197 or 198.

The nose pieces 71 of the fairings 70 are made of stainless steel or other suitable material. The tail piece 74 and cable clamp 75 are made of a suitable plastic selected for bouyancy, resilience, durability and resistance to the effect of salt water. Currently available suitable materials are polypropylene and polyethylene. The support column 76 is selected for similar properties and for low static friction. The present preferred material is an acetal resin called "Delrin".

In order to support the fairings and the electric cable on the strength member 1, support fairings are spaced along the strength member 1 and pivotally fixed thereto as shown in FIGS. 4 and 5 by a support ring 104 fixed as by welding, cementing, or other suitable means to the strength member 1 and spaced thrust washers 105 and 106 mounted on the strength member and engageable with the edges of a recess 107 formed in the nose piece 71.

Aligners 108 and 109 are provided in staggered recesses 110 and 111 of the tail pieces to maintain alignment of adjacent fairings.

The above-described tow line is advantageous in obtaining support of adjacent fairings via the support columns provided in the fairings, thereby protecting adjacent edges of the fairings.

The tow line also provides a compact arrangement of fairings of minimum width to house and support stretchable electric cables.

A further advantage of the above-described tow line is the provision of a slot 79 in the forward portion of the tail piece whereby the stretchable cables 78 can easily be assembled into their passage 77 in the tail piece. During assembly, after the cables 78 are positioned in place, column 76 is secured and then clamp 75 is slipped into place and expanded by its cam 103.

A further advantage of the construction described above and shown in FIGS. 4 and 5, is that the steel nose piece 71 can be made shorter in its chordal length and thereby the center of gravity of the fairing cables combination can be more easily located closer to the strength member. This feature improves towing performance.

It will be understood that various changes in the details, materials, and arrangements of parts, which have been herein described and illustrated in order to explain the nature of the invention, may be made by those skilled in the art within the principle and scope of the invention as expressed in the appended claims.

We claim:
1. A towline with fairings thereon by which a submerged object may be towed from a ship comprising:
   a flexible strength member,
   a plurality of fairing units arranged in end-to-end abutting relationship along and individually pivotally mounted upon said strength member,
   each such unit having a channel-shaped nose piece, with the strength member received in and extending along the channel of the nose piece, and a tail piece having an edge portion received in and closing the open face of the channel,
   a support column positioned in each said nose piece adjacent said strength member and spaced from said tail piece,
   each said support column extending beyond the opposite edges of said nose piece to prevent rubbing of adjacent nose piece surfaces and to act as pivot members for said fairings as said strength member curves in being towed through water,
   stretchable electrical cables received in the space between said tail piece and column along said strength member for establishing electrical communication between said ship and submerged object,
   clamp means for clamping and supporting said electrical cable at spaced points therealong,
   means for pivotally securing selected of said fairings in spaced relation along said strength member to support on each of said selected pivoted fairings one or more of the remaining fairings,
   said clamping means including:
   a forward clamping block fixed to said column and adjacent one side of said electrical cables,
   a rearward clamping block fixed to said tail piece and adjacent the opposite side of said electrical cables,
   said rearward block being slotted to form a face portion integral with said block and movable in the direction of said electrical cable, and
   cam means positioned in said slot and rotatable to urge said face portion forward to clamp said electrical cable between said blocks,
   said tail piece being formed with a tongue or projection, and
   said rearward block being formed with a groove to receive said tail piece tongue to support said rearward block on said tail piece.

2. A towline with fairings thereon according to claim 1,
   said nose piece being apertured adjacent said cam means to permit adjustment of said cam from the exterior of the assembled fairing.

3. A towline with fairings thereon according to claim 1,
   said clamping blocks being formed to present convex curved surfaces adjacent said electrical cable to concentrate the clamping force on a limited portion of said electric cable between said side edges of said nose piece and to provide a substantially circular bend in and support for said electrical cable when said towline is wound and stored on a drum.

4. A towline with fairings thereon according to claim 2,
   said clamping blocks being formed to present convex curved surfaces adjacent said electrical cable to concentrate the clamping force on a limited portion of said electrical cable between said side edges of said nose piece and to provide a substantially circular bend in and support for said electrical cable when said tow line is wound and stored on a drum.

5. A towline with fairings thereon according to claim 3,
   said clamping blocks being formed with a gripping surface in the areas clamping on said electrical cable.

6. A towline with fairings thereon according to claim 4,
   said clamping blocks being formed with a gripping surface in the areas clamping on said electrical cable.

References Cited

UNITED STATES PATENTS

| | | | |
|---|---|---|---|
| 3,176,646 | 4/1965 | Natwick et al. | 114—235 |
| 3,194,204 | 7/1965 | Nichols et al. | 114—235 |

MILTON BUCHLER, *Primary Examiner.*

T. M. BLIX, *Assistant Examiner.*